Figure 1:
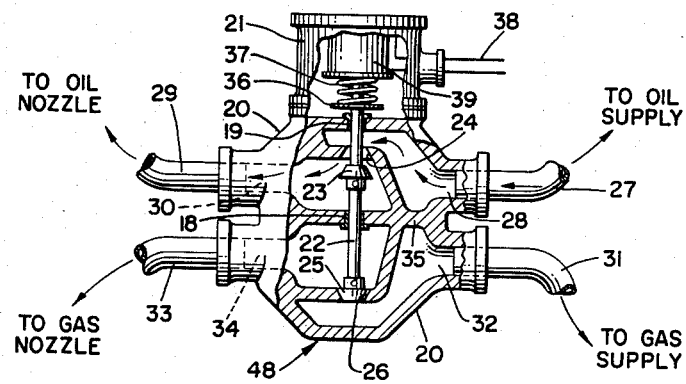

INVENTOR.
WILLIAM R. IRWIN

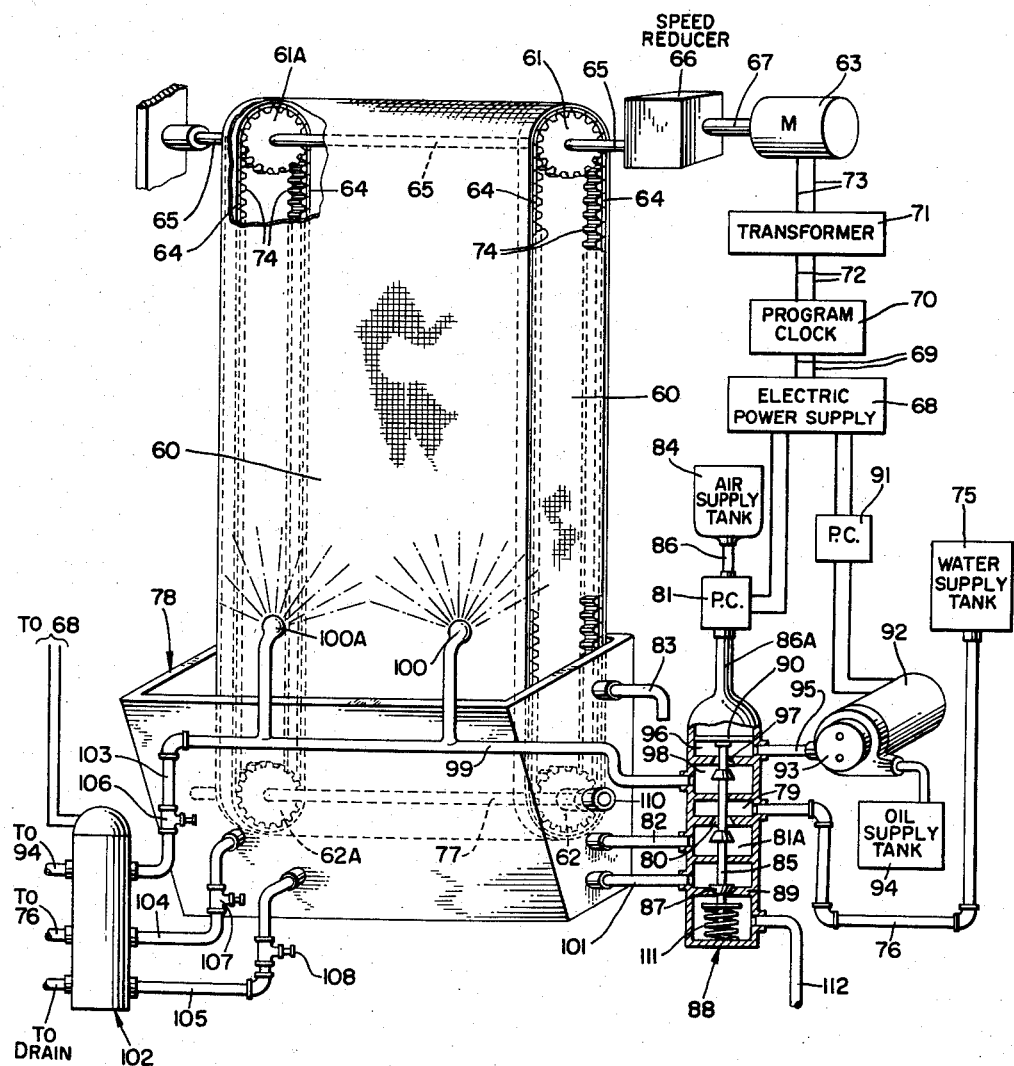

United States Patent Office 3,071,936
Patented Jan. 8, 1963

3,071,936
AUTOMATIC REFRIGERATING-DEFROSTING
SYSTEM
William R. Irwin, P.O. Box 155, Boulevard Station,
Bronx 59, N.Y.
Filed Nov. 3, 1958, Ser. No. 771,619
8 Claims. (Cl. 62—278)

This invention relates to a double purpose valve preferably of the solenoid type, whereby two different fluids or gases are controlled and whereby the two liquids or gases so controlled, being kept separately apart within a system of piping or other apparatus may each be caused to reach a different destination either within or outside of the said system. It is within the intent and spirit of the invention that such liquids or gases may be caused to combine within some part of the system in which they are contained or at the terminus or outside the terminus of said system although this feature is not the most important one of the invention.

It is known that valves of the solenoid type have been suggested wherein a liquid or gas inherent in a system of piping and other apparatus of which said solenoid type valve is a part may be caused to flow at two or more different pressure or temperature conditions within said system, the difference in pressure or temperature in such a system being caused wholly or in part by the action of said solenoid type valve.

The valves usually used to bring about this described condition are three port valves whether they are solenoid actuated or of a type controlled by pneumatic pressure, hydraulic pressure or other means. They are called "three port valves" here only in the sense that their main passageways for the passage of a liquid or a gas other than the controlling medium ports of the valve do not conflict with those ports used for passage of the fluid or gas so controlled through the valve.

The valves used for the purpose mentioned are three port valves insofar as one passageway through such a valve would be normally open although using a port common to a normally closed passageway, the normally open passageway being caused to close as the normally closed passageway is made to open.

Such a valve used in a system of piping and other apparatus, wherein two passageways have a common entrance port, involves naturally, an intermixture of the contents of said system as said contents reach the common port although a difference in pressure or temperature might be maintained by actuation of the said valve.

The valve proposed herein allows for the flow and maintenance of separation of two entirely different liquids or gases throughout a system of piping and other apparatus or through portions of a system of piping and other apparatus.

It is provided in a preferred embodiment that similar molecules of a gas or fluid may be separated throughout a portion of a system of piping although said molecules may be intermixed at other points.

The principles of operation as mentioned in the last paragraph may of course, be brought about by using a plurality of valves in a system of piping and fittings but herein lies the factor that even a slight delay in operation of one or more of the said plurality may bring about a failure in such a system. In addition to this, there could always be the possibility of mechanical, electrical or other misfunction which would negate the purpose of such a system and cause misoperation and conceivably, severe damage.

The proposed invention, while making no claim for the prevention of mechanical or electrical failure in a system of piping, valves or other apparatus, will show that the effects of mechanical or other failure can be minimized to the greatest extent in a system where two different liquids or gases are kept separate throughout their entire courses in such a system or are caused to intermingle therein at a specified point or points.

Other objects and advantages of the invention will appear hereinafter.

In an embodiment of the invention I provide an electrically operated solenoid valve having four ports to attain the desired result in such a system as described hereinbefore. It should not be concluded however, that electric solenoid valve means are the only means to achieve the objects of the invention.

Other valve means, controllable by air, steam, hydraulic pressure, or the like, or any of various types of thermostatic means might also conceivably be employed although such other means might not be as advantageous as the solenoid valve method.

The said preferred embodiment allows two dissimiliar elements to make their ways through the said solenoid valve without intermixture of contents, one passageway through said valve being normally open, the other passageway therethrough being normally closed.

Referring to the drawings:

FIG. 1 is a side elevation partly cut away, illustrating the said preferred embodiment of an electrically operable solenoid valve, designated in this particular figure as applying oil and gas to an oil and gas burning furnace or furnaces. The actual supply sources of fuel and the furnaces, nozzles, air supply means and the like have not been dealt with here as it is well understood that those with a knowledge of the art are familiar with the mechanics of burning fuels of different types at different rates of combustion in one or more furnaces.

Figure 2:
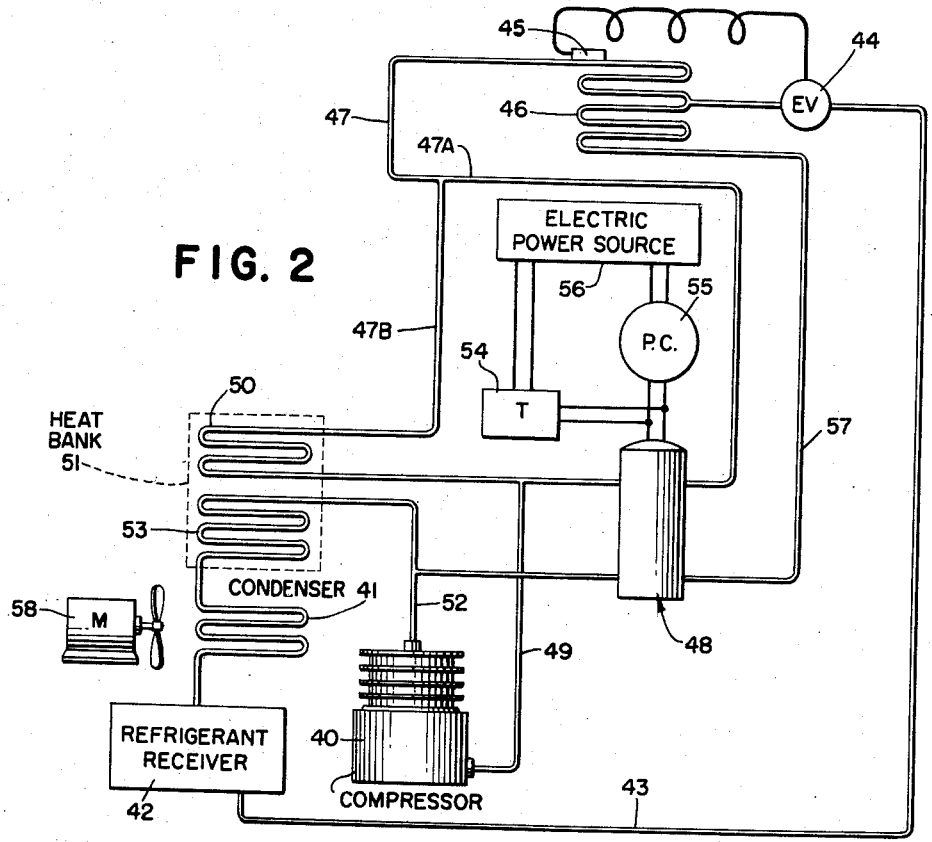

FIG. 2 is a diagrammatic view of a refrigerating-defrosting system in which the above said solenoid valve plays an important part.

FIG. 3 is a diagrammatic-perspective view, partly cut away, which shows an air-filter cleaning device with appurtenances which include an air actuated, dual purpose valve with means for maintaining a hot water passage therethrough separate from a passage therethrough used for draining dirty water from the sump of the cleaning device. Other adjuncts are also provided for supplying oil to be sprayed on the filter screen and a solenoid valve is provided which duplicates in function the said air actuated valve. The solenoid valve has manual shut-off valves emplaced in conduits leading to said solenoid valve which isolate it from the air-filter cleaner except in such instances wherein it is desired to use it rather than the pneumatically actuated valve.

The valve of FIG. 1 is shown in only its essential form, various improvements being applicable by those skilled in the art.

The body of the valve 20 has soldered thereto a cap 21 which contains the electrical elements of the unit.

The valve stem 22 has integrally attached thereon a valve disc 23 which opens or closes the upper passageway through the valve by moving into or away from the seat orifice 24 which is machined into a portion of said upper passageway.

Valve disc 25 opens or closes the lower passageway through the valve by virtue of moving away from or into the seat orifice 26 machined into a portion of the lower passageway.

Valve disc 25 is machined integrally upon valve stem 22 and moves in unison with valve disc 23, closing the lower passageway through the valve at the same moment that valve disc 23 is opening the upper passageway.

Shown in the drawing is a pipe 27 which connects an oil supply source with the upper passageway of the valve. The pipe 27 leads into upper interior passageway 28, through the valve seat orifice 24, interior upper passageway 30 and thence into pipe 29, said pipe 29 leading to an oil nozzle and furnace which is not shown.

Pipe 31 connects a gas supply source with the lower passageway of the valve. Gas enters the lower passageway 32 and when valve disc 25 is withdrawn from seat orifice 26 gas enters passageway 34 and pipe 33 from where it goes to a gas nozzle, not shown in the drawing. It is obvious that the gas and oil supplied could be burned in the same furnace, if desired. Proper air supply for both fuels must also be provided.

The interior of the valve body has machined and molded integrally therein a dividing wall complex web 35 which maintains effective separation of the contents of the two passageway through the valve and prevents liquid coming into contact with solenoid coil 38.

A rest 36 is cast and machined integrally with the valve stem 22 upon which a spring 37 is situated and the top of said spring makes contact with the inside surface of a protective cover 39 placed over solenoid winding 38 and forces said stem to its normal downward position, closing seat orifice 26 and simultaneously keeping open seat orifice 24 when the stem of the valve is not actuated electrically by means of solenoid winding 38.

In operation, when winding 38 receives electrical energy, the valve stem 22 is caused to rise against the pressure exerted by spring 37, closing valve seat orifice 24 by action of valve disc 23 entering upon said orifice. Simultaneously, lower valve seat orifice 26 is opened by withdrawal therefrom of valve disc 25, opening the lower passageway through the valve body while at the same time closing the upper passageway therethrough. Glands 18 and 19 inserted into different sections of web complex 35 serve to prevent leakage from one valve compartment to another while allowing free perpendicular movement of the valve stem.

The refrigerating-defrosting system shown in FIG. 2 embodies the use of a method now commonly known and an improvement thereon, whereby the compressor removes heat-laden gaseous refrigerant from an evaporator and compresses it, the said gaseous refrigerant then passes through a condenser where much of the heat is extracted from the refrigerant and it is caused to condense into a liquid and to pass into a liquid refrigerant receiver.

A certain amount of heat is stored in a vault or "heat-bank" during the normal refrigerating cycle and this heat is used at certain intervals to defrost the outside surfaces of the evaporator when it is determined in any of various known ways that said evaporator has accumulated a coating of ice or frost which interferes with its ability to remove heat from the space to be cooled.

In drawing the compressor 40, condenser 41, the refrigerant receiver 42, refrigerant liquid line 43, thermostatic expansion valve 44 with feeler bulb 45, evaporator 46 and a pipeline leading directly from the evaporator to the compressor would constitute an ordinary refrigeration system.

The said system has been modified to include a heat-bank 51 wherein two coils 50 and 53 are immersed in a solution with a low freezing point and commonly called "anti-freeze." The heat-bank is a well known constituent in the refrigeration industry and is particularly suitable for low temperature applications such as ice-cream storage.

To this system I have added the already mentioned solenoid operated flow control valve 48 which has two separate and distinct passageways therethrough which are essential for the operation of the described apparatus in contradistinction of which a dual purpose valve having one common port could not bring about the result intended.

Included as necessary parts of the system are refrigerant conduit 47 leading out of the evaporator 46, and conduits 47A and 47B. Conduit 47A leads to the normally open upper passageway in valve 48 and said normally open passageway follows a course through the said valve and returns by way of conduit 49 to the suction intake of the compressor 40. Conduit 47B follows a course through coil 50 immersed in the anti-freeze compound filling the heat-bank 51 and is connected to conduit 49 leading into the suction intake of the compressor.

The passage provided for the gaseous refrigerant as it leaves the evaporator and progresses through conduits 47, 47A, 47B, coil 50 and pipeline 49 is comparable to a shunt circuit in a field of the electrical sciences. Though both passageways 47A and 47B are open for the passage of refrigerant gas to the compressor, the conduit 47A leading through the open upper passageway of valve 48 is intended to be shorter and to contain less resistance to the flow of refrigerant than does conduit 47B leading through coil 50. Thus the effect of the low temperature refrigerant passing through coil 50 and picking up heat from the anti-freeze compound stored in the heat-bank 51 is minimized under ordinary circumstances.

The amount of heat pick up by the gaseous refrigerant passing through coil 50 on the normal refrigerating cycle is however, within the province of the designer in laying out the plans for a particular refrigerating system and is no concern of this invention except as part of the general description thereof.

The refrigerating cycle of the refrigerating-defrosting system takes place as follows: On a start-up of the system for cooling purposes, the compressor 40 is caused to pull in heat laden gaseous refrigerant from the evaporator 46 via already described conduits 47, 47A, 47B and 49 and coil 50 and thence through its suction intake.

The gaseous refrigerant is compressed and heated by action of the compressor valves, pistons and the like which are not shown in the interest of simplicity but which are well known to those skilled in the art.

The high pressure, super-heated refrigerant gas leaves the compressor and travels through conduit 52 and enters coil 53 which is immersed in the anti-freeze solution which fills the heat-bank 51, giving up a large amount of its heat to the said anti-freeze solution.

From coil 53 the high pressure refrigerant gas is forced into and through condenser coil 41 where its temperature is further reduced by the action of the motorized fan 58 blowing a quantity of cooling air across the said condenser coil 41.

As the temperature of the high pressure refrigerant gas is reduced in the condenser its structure is changed and the refrigerant is liquefied and forced into the receiver 42.

The liquid refrigerant leaves the receiver via conduit 43 and extends via conduit 43 as a solid column of liquid to the expansion valve 44. As the flow of liquid refrigerant is restricted at the expansion valve accordingly as the feeler bulb 45 reacts to the temperature of the evaporator portion to which said feeler bulb is attached, the said feeler bulb, by means of a gas confined therein, regulates the opening, closing and throttling of the expansion valve orifice leading into the evaporator, communication between the feeler bulb 45 and the expansion valve 44 being maintained by a piece of hollow tubing which allows pressures in the feeler bulb to be communicated to the expansion valve orifice opening and closing means.

As the refrigerant passes from line 43 and through expansion valve 44 it is caused to expand in the evaporator, becomes gaseous, and is therefore capable of picking up large quantities of B.t.u.'s.

The heat laden, gaseous refrigerant is drawn into the compressor as already described and the refrigeration cycle is complete. The cycle is continued until the evaporator 46 has either cooled the space in which it is installed to a predetermined degree of temperature or until so much ice is formed in the outside spaces and on the surfaces of the evaporator that its efficiency is impaired and it becomes necessary to defrost it.

Determination that the evaporator must be defrosted may be resolved by sight, by the use of a thermostat or, by other means. In the present embodiment, a thermostat 54, a program clock 55 and a source of electric power 56 are provided to bring about the desired result.

It should be understood that the clock or thermostat could be used in various electrical hook-ups or that each might be used only by itself to actuate solenoid valve 48 to bring about the desired result of putting the system on a cycle whereby it defrosts the evaporator, but in the present instance a clock and thermostat in series-parallel arrangement is preferred.

When it is determined by actuation of the thermostat 54 or of the clock 55 that the evaporator should be defrosted, the solenoid operated valve 48, by virtue of its winding 38 receiving electrical energy, closes its normally open passageway there through and opens its associated normally closed passageway therethrough simultaneously.

Super-heated, high pressure refrigerant gas now leaves the compressor 40 by conduit 52 and travels through the now open, normally closed lower passageway of valve 48 which in FIG. 1 is shown more clearly and which is indicated at 31, 32, 33 and 34, valve disc 25 having been withdrawn from orifice 26.

The super-heated, high pressure refrigerant gas now travels through conduit 57 and enters the coils of evaporator 46 and defrosts the outside surfaces of said evaporator. The action of the expansion valve 44 is rendered negative at this point as the heat requirements of the feeler bulb 45 are nullified by the pressure and high temperature of the gas leaving the compressor which equals or exceeds that of the liquid in the receiver 42 and refrigerant conduit 43.

As the super-heated, high pressure refrigerant passes through the evaporator it gives up a portion of its heat to the ice or frost which had formed on the evaporator coils during the normal refrigeration cycle. As the normally open, upper passageway through valve 48 is now closed, the refrigerant leaving the evaporator must flow through pipeline 47B and coil 50 immersed in the antifreeze liquid of heat-bank 51. The passage or refrigerant gas through coil 50 and its picking up heat therein from the said anti-freeze solution assures a sufficient quantity of heat to complete the defrosting of the evaporator 46 in an alloted time period as determined by the program clock 55 or by other means.

When a sufficient interval of time has elapsed and the evaporator 46 has been defrosted the valve 48 is caused to revert to its normal condition of operation with the upper passageway therethrough open and its lower passageway therethrough closed. The restoration of the valve 48 to its normal operating position puts the refrigerating-defrosting system back on a refrigerating cycle.

The operation of the air-filter cleaning device of FIG. 3 is accomplished as follows: An endless screen 60 is caused to enter a portion of its area into a sump or tank 78 at periodic intervals. These intervals are determined by a program clock 70 at which times that portion of the screen which is positioned in the sump is washed by action of water, preferably hot, which enters the sump from a tank 75.

The water flows from tank 75 into a pipeline 76 and thence into chamber 79 of pneumatically operated valve 88, through normally closed orifice 80 of the valve and thence through chamber 81A and pipeline 82 from where it enters the sump 78.

As the normally closed passageway through orifice 80 opens, the normally open passageway and pipeline 101, normally open valve seat orifice 87 at the bottom chamber of the valve 88 and drainpipe 112, is closed by action of valve stem 85 descending and causing the lowermost valve disc 89, integrally attached to stem 85, to become seated in valve seat orifice 87.

The action of the water from supply tank 75 as it washes upwardly against the immersed portion of screen 60 in tank 78 loosens the dirt from the immersed portion of the screen, the dirt and overflowing water going out drainpipe 83 to waste.

Another program clock 91 actuates a motor 92 which rotates gears of pump 93 which draws oil from tank 94, sending the oil to nozzles 100 and 100A whence it is discharged against a portion of screen 60 at a slight pressure. The oil, distributed finely and evenly over the screen, adds great dirt and dust entrapment values to the filter-screen. Of course, at those intervals when the filter portions are washed by hot water, much or all of the oil enveloping the portions washed may be separated from the screen with the entrapped dust or other foreign matter.

The passage of oil to the nozzles is from storage tank 94, to pump 93, supply pipe 95, valve chamber 96, through normally closed valve seat orifice 97, valve chamber 98, pipeline 99 and thence to nozzles 100 and 100A.

It should be obvious that a portion of the screen 60 could be sprayed with oil as the sump 78 is in that period when it is drained or being drained of water. This would involve a change in the arrangement of the valve orifices shown and the valve passageway for the oil would be open when the lowermost passageway for draining the sump was also in the open position.

Precluding a possibility of the system becoming inoperative due to the failure of the pneumatic valve to function properly, a solenoid operated valve 102 is provided which performs the same function as the pneumatic valve.

The solenoid valve 102 has affixed in connection therewith pipelines 103, 104 and 105 into which are affixed hand shut-off valves 106, 107 and 108. Obviously, when the pneumatic valve 88 is out of service these hand valves may be opened and the solenoid valve used in the pneumatic valve's place.

Operation of the endless screen 60 is effected by the program clock 70 drawing electric power from power source 68 and transmitting the said power at selected intervals to a step-down transformer 71 from which electrical energy, at a reduced potential, is supplied to low-voltage motor 63. Voltage and current is transmitted over electrical conduits 69, 72 and 73.

A motor 63 is connected to a speed reducing transmission 66 by shaft 67 and said transmission in turn rotates shaft 65 at the required speed to move endless screen 60 a limited distance as called for at various intervals of time by program clock 70.

To acomplish the desired movement of the screen 60, the shaft 65 has welded thereto toothed gears 61 and 61A which engage teeth 74 which are attached to strips 64, said strips being soldered segmentally to the screen 60 in order to facilitate the turning of the different portions of said screen as the said portions reach the uppermost or lowermost limits of their travel over the gears 61, 61A, 62 and 62A.

The lower gears, 62 and 62A are idlers and are affixed to shaft 77 which revolves freely in bearings 110 emplaced in the sump case. Only one bearing is shown in the figure.

The pneumatic valve 88 is actuated at periodic intervals as determined by program clock 81, the said clock receiving electrical power from the supply source 68. When the clock 81 is actuated to let air pass therethrough, air is released from the supply tank 84 under pressure and passing through the clock and pipelines 86 and 86A it acts against the diaphragm 90 in the pneumatic valve 88 and forces the valve stem 85 downwards against the opposing force of spring 111.

It should be apparent that a single program clock, presently available in industry, could be employed to actuate the stem within the pneumatic valve as well as motor 92 and motor 63. In order to avoid ambiguity, I have however depicted three clocks or timing devices, 70, 81 and 91.

It should be noted that a spring loaded, snap action device is readily applicable to the described pneumatic valve. Such a device would cause the valve stem, soldered in the present instance to the diaphragm 90, to instantaneously close one or more valve orifices while at the same time it would open one or more other orifices by the effect of valve closing discs affixed thereto or integrally machined thereon.

Now, having described and illustrated my invention, what I claim is:

1. A refrigerating-evaporator defrosting system comprising a means for compressing refrigerant, a pipeline leading from said compressing means to a first pipeline junction, a first pipeline leading from said junction to a coil immersed in a solution having a low freezing point, a condensing coil for changing high-temperature gaseous refrigerant to refrigerant liquid, a pipeline connecting said condensing coil to said immersed coil, a liquid refrigerant receiver, a pipeline connecting said liquid refrigerant receiver with said condensing coil, valve means for changing high pressure refrigerant liquid to a low temperature, low pressure gaseous refrigerant solution, a pipeline connecting said valve means with said liquid refrigerant receiver, an evaporator wherein said refrigerant is adapted to having heat added thereto, connecting means between said valve means and said evaporator, a pipeline leading from said evaporator to a second pipeline junction, a first pipeline leading from said second junction to a second coil immersed in said solution with a low freezing point, a pipeline leading from said second immersed coil to a third pipeline junction, a first pipeline leading from said third pipeline junction to the low pressure side of said compressing means, a second pipeline leading from said first pipeline junction to a valve, said valve having a normally open passageway therethrough and a normally closed passageway therethrough and means to close said normally open passageway while simultaneously opening said normally closed passageway, said passageways in said valve not being capable of having their contents intermixed, said second pipeline leading from said first pipeline junction to the normally closed passageway of said valve, a pipeline leading from said normally closed passageway of said valve to said evaporator, a pipeline extending from said second pipeline junction to the normally open passageway of said valve, and a pipeline leading from the exit of said normally open passageway of said valve to said third pipeline junction.

2. A refrigerating-evaporator defrosting system comprising a means for compressing refrigerant, a pipeline leading from said compressing means to a first pipeline junction, a first pipeline leading from said junction to a coil immersed in a solution having a low freezing point, condensing means for changing gaseous high-temperature refrigerant to liquid refrigerant, a pipeline connecting said condensing means to said immersed coil, a liquid refrigerant receiver, a pipeline connecting said liquid refrigerant receiver with said condensing means, valve means for changing high pressure refrigerant liquid to a low temperature, low pressure refrigerant solution, a pipeline connecting said valve means with said liquid refrigerant receiver, an evaporator wherein said refrigerant is adapted to having heat added thereto, connecting means between said valve means and said evaporator, a pipeline leading from said evaporator to a second pipeline junction, a first pipeline leading from said second junction to a second coil immersed in said solution with a low freezing point, a pipeline leading from said second immersed coil to a third pipeline junction, a first pipeline leading from said third pipeline junction to the low pressure side of said compressing means, a second pipeline leading from said first pipeline junction to a valve, said valve having a normally open passageway therethrough and a normally closed passageway therethrough and means to close said normally open passageway while simultaneously opening said normally closed passageway, said passageways in said valve not being capable of having their contents intermixed, said second pipeline leading from said first pipeline junction to the normally closed passageway of said valve, a pipeline leading from said normally closed passageway of said valve to said evaporator, a pipeline extending from said second pipeline junction to the normally open passageway of said valve, and a pipeline leading from the exit of said normally open passageway of said valve to the third said pipeline junction.

3. A structure as described in claim 2, with said valve having a normally open passageway therethrough and a normally closed passageway therethrough being responsive to the cooling effect of said evaporator to actuate provided thermostatic means to close said normally open passageway while simultaneously opening said normally closed passageway to cause said refrigerating-defrosting system to immediately revert from a refrigerating cycle to a defrosting cycle, and said structure being responsive to the warming effect of said evaporator on said thermostatic means to act upon the last said valve to restore the said structure to its refrigerating cycle upon completion of said defrosting cycle.

4. A structure as described in claim 2, with said valve having a normally open passageway therethrough and a normally closed passageway therethrough being responsive to timeclock means preset to close said normally open passageway at predetermined intervals while simultaneously opening said normally closed passageway to cause said refrigerating-defrosting system to immediately revert from a refrigerating cycle to a defrosting cycle, and said structure being responsive to said timeclock means acting upon the last said valve to restore the said structure to its refrigerating cycle upon completion of the time interval required for said defrosting cycle.

5. A structure as described in claim 2, in which said valve having a normally open passageway therethrough and a normally closed passageway therethrough includes means to effect the positive opening of one passageway during closure of the other.

6. A structure as described in claim 2, in which said valve having a normally open passageway therethrough and a normally closed passageway therethrough is electrically operated to effect the positive opening of one passageway during the closure of the other.

7. A structure as described in claim 2, in which said valve having a normally open passageway therethrough and a normally closed passageway therethrough comprises a single casing having a pair of inlet orifices, a pair of outlet orifices, valve seats within said passageways and closure means operable in one direction of movement to effect the positive opening of the normally closed passageway and the positive closure of the normally open passageway, and the contents of the normally open passageway and the contents of the normally closed passageway not being miscible within said valve casing.

8. A structure as described in claim 2, in which said valve having a normally open passageway therethrough and a normally closed passageway therethrough has passageway closure members intrinsic to one valve stem to effect the positive simultaneous opening to one passageway while effecting the positive simultaneous closing of the other passageway.

References Cited in the file of this patent

UNITED STATES PATENTS

| | | |
|---|---|---|
| 1,092,718 | Johnson | Apr. 7, 1914 |
| 1,168,744 | Rolland | Jan. 18, 1916 |
| 1,660,436 | Dittmeyer | Feb. 28, 1928 |
| 1,799,299 | Johnston | Apr. 7, 1931 |
| 1,863,427 | Warren | June 14, 1932 |
| 2,351,140 | McCloy | June 13, 1944 |
| 2,525,560 | Pabst | Oct. 10, 1950 |
| 2,589,855 | Pabst | Mar. 18, 1952 |
| 2,641,908 | La Porte | June 16, 1953 |
| 2,694,904 | Lange et al. | Nov. 23, 1954 |
| 2,748,982 | Copping | June 5, 1956 |
| 2,770,104 | Sweynor | Nov. 13, 1956 |
| 2,916,893 | Kramer | Dec. 15, 1959 |